United States Patent [19]

Mizokami

[11] Patent Number: 4,498,753
[45] Date of Patent: Feb. 12, 1985

[54] PHOTOMETRIC APPARATUS FOR CAMERAS

[75] Inventor: Kazunori Mizokami, Hachioji, Japan

[73] Assignee: Olympus Optical Co., Ltd., Tokyo, Japan

[21] Appl. No.: 532,686

[22] Filed: Sep. 16, 1983

[30] Foreign Application Priority Data

Jan. 12, 1983 [JP] Japan .................. 58-2506[U]

[51] Int. Cl.³ .......................... G03B 7/081; G01J 1/44
[52] U.S. Cl. .................... 354/425; 250/214 P; 250/214 L; 356/223
[58] Field of Search .................... 354/425–428, 354/484; 250/214 P, 214 L, 214 C; 356/223

[56] References Cited

FOREIGN PATENT DOCUMENTS 49-70625 7/1974 Japan .
51-13659 5/1976 Japan .
51-26267 8/1976 Japan .
52-50229 4/1977 Japan .

Primary Examiner—William B. Perkey
Attorney, Agent, or Firm—Louis Weinstein

[57] ABSTRACT

A photometric apparatus for a camera comprises a reference voltage circuit; an operational amplifier including a photoelectromotive element for photometry, an output terminal of said reference voltage circuit and an input terminal of said amplifier being connected through an impedeance element to a voltage divider tap of a battery; and a switching circuit for switching said reference voltage circuit to an operable condition as well as for changing set resistors which apply a bias current to said operational amplifier, in synchronism with a shutter releasing operation.

7 Claims, 5 Drawing Figures

PHOTOMETRIC APPARATUS FOR CAMERAS

BACKGROUND OF THE INVENTION

The present invention relates to a photometric apparatus for a camera, and more particularly, to a photometric apparatus for use with a camera capable of logarithmetically converting a photocurrent flowing through a photoelectromotive element to produce an output of photometric data simultaneously with the initiation of a photometric operation.

It is known to employ a circuit arrangement shown in FIG. 1 of a photometric apparatus for a camera in which a photocurrent generated in a photoelectromotive element for photometry such as a silicon photodiode or a solar battery in accordance with the brightness of an object being photographed is picked up as a logarithmically converted voltage. Specifically, with the photometric apparatus shown in FIG. 1, a photoelectromotive element 3 is connected between a non-inverting input terminal $\oplus$ of an operational amplifier 1 which is connected to an output terminal of a reference voltage circuit 2 and an inverting input terminal $\ominus$ of the amplifier 1, and a logarithmic compression diode 4 is connected between the inverting input terminal $\ominus$ and an output terminal of the amplifier 1. Power supply terminals for the amplifier 1 and the reference voltage circuit 2 are connected through a power switch 5 which is closed by a shutter release operation to a battery 6. A resistor 7 provides a bias current for activating the amplifier 1. In the photometric apparatus in which the photoelectromotive element 3 is connected between input terminals $\oplus$ and $\ominus$ of the amplifier 1, the same voltage is always maintained between both terminals of the photoelectromotive element 3 and hence good linearity of photosensitive characteristics may be obtained.

However, the photometric apparatus requires a considerable time period until an output of a normal photometric datum is derived from the operational amplifier 1 after the steady state is attained upon closing of the power switch 5 by a shutter release operation. The main reason is that there are the junction capacity on photoelectromotive element 3 and diode 4 and the distributed capacity on other circuit portions so that it requires time to discharge the charges across these electrostatic capacities by a photocurrent of photoelectromotive element 3. Specifically, an output of the amplifier 1, as shown in FIG. 2 with a solid line, swings up to a level of a power voltage Vcc (or the ground potential) at the moment power switch 5 is closed and subsequently the output tends toward the photometric voltage $V_{BV}$ corresponding to the brightness of an object being photographed as the charge across the electrostatic capacities are discharged by the photocurrent. The photometric voltage $V_{BV}$ is brought into a steady state when the zero bias condition is obtained between both terminals of the element 3 as the charges are discharged. As a result, under a condition that an object being photographed is so dark that the photocurrent is as low as $10^{-11}$ to $10^{-12}$ amperes, the time period from the closed time of a power switch to the time when an output of the amplifier 1 is brought into a steady state of the normal photometric voltage $V_{BV}$ requires several seconds to tens seconds. To this end, an improved photometric apparatus has been devised in which a second diode 8 is connected in a reversely parallel relationship with the above-stated logarithmic compression diode 4. In the photometric apparatus, as shown in FIG. 2 with a dotted line, although a photometric voltage is brought into a steady state slightly sooner compared with an apparatus without diode 8, one cannot expect a sharp reduction of time. Additionally, a number of countermeasures have been proposed as means for compensating the time lag of response by the above-stated capacity components. However, all these conventional countermeasures require a delicate high impedance circuit, a complicated circuit construction of IC, an element for applying a photobias or the like, resulting in an inevitably complicated construction of a photometric apparatus. Furthermore, even with such countermeasures a time lag over several tens msec is unavoidable.

On the other hand, when a high speed continuous photography is conducted with an apparatus such as a motor drive, the time period from the initiation of a shutter release operation to the completion thereof is about 5 msec at the most. Accordingly, with an apparatus in which power switch 5 is closed in response to a shutter release operation, it is disadvantageously impossible to take a picture of a proper exposure with a motor drive in an areas of comparatively dark surroundings.

However, a power source for a photometric apparatus is restricted to the comparatively small capacity source such as a button shaped silver battery or a mercury battery and hence it is requested to keep a consumed power minimum. Accordingly, if a power switch is closed prior to a shutter release operation so that a photometric apparatus may be brought into an operational condition, the time lag of response by the above-stated capacity components may be improved while the power consumption is disadvantageously high. Additionally, as the power switch is kept off to save the power while not in use, a photography may be conducted in two operational steps and there is the possibility of missing a shutter chance to a rapidly moving object being photographed.

SUMMARY OF THE INVENTION

In view of the foregoing, it is an object of the invention to provide a photometric apparatus for a camera in which prior to an initiation of photometry a divided voltage of a battery is introduced through an impedance element into an operational amplifier as a reference voltage instead of an output of a reference voltage circuit which is in an inoperable condition, and the operational amplifier to which a photoelectromotive element for photometry is connected with a zero bias has a construction with a programmable gain capable of switching a bias current so as to be changed from an extremely low power consumption mode to a normal power consumption mode simultaneously with the initiation of photometry, resulting in a high power saving effect and a quick response in photometric outputs.

According to the invention, since the operational amplifier is constantly supplied with a bias even prior to an initiation of photometry as well as a reference voltage from a battery instead of an output from a reference voltage circuit which is in an inoperable condition, it is possible to take out a photometric output in accordance with the amount of light instantly in synchronism with a photometry initiation signal. As a result, a high speed continuous photographing is made possible with a motor drive and there is no possibility of missing a shutter chance for a rapidly moving object being photographed. Furthermore, since the operational amplifier is in an extremely low power consumption mode and the reference voltage circuit is in an inoperable condition prior to an initiation of photometry, advantages are that a power consumption of the photometric apparatus in its entirety and a battery are extremely small and a small size battery for cameras is sufficiently available.

DETAILED DESCRIPTION OF PREFERRED EMBODIMENTS

Figure 1:
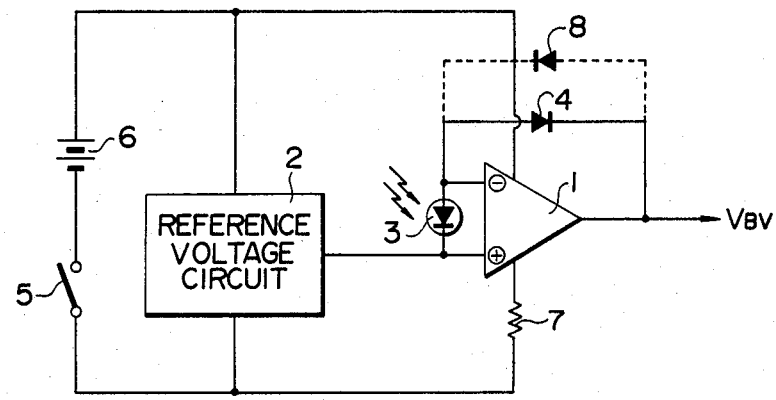
FIG. 1 is a schematic diagram of a circuit illustrating an example of conventional photometric apparatus for a camera.
Figure 2:
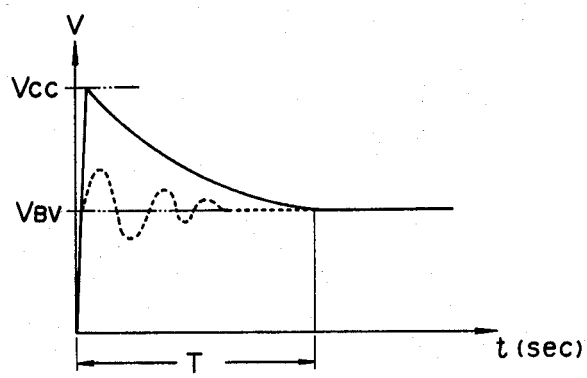
FIG. 2 is a diagram illustrating a characteristic curve of variation in output voltage during the photometry of the photometric apparatus shown in FIG. 1.
Figure 3:
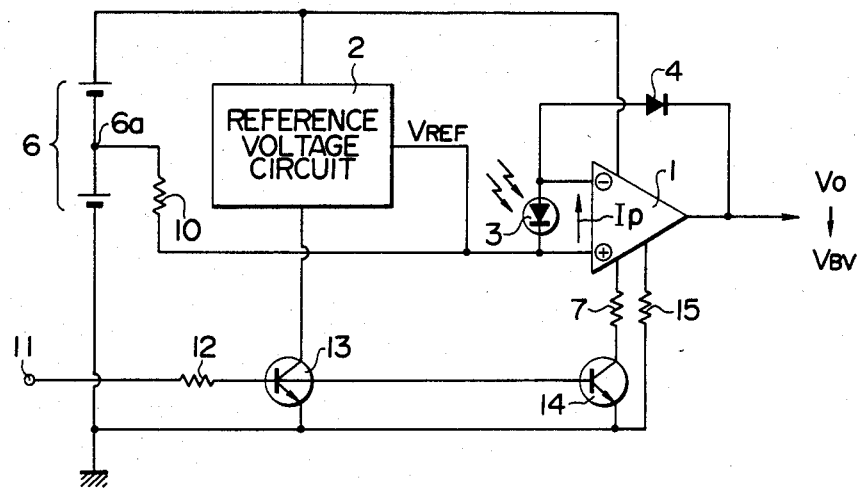
FIG. 3 is a schematic diagram of a circuit illustrating one embodiment of the invention.

Referring to FIG. 3, a resistor 10 of high resistance is provided, one end of which is connected to an intermediate tap 6a (a divided voltage terminal) of a battery 6 of voltage Vcc and the other end of which is connected to an output terminal of a reference voltage circuit 2 which produces a reference voltage $V_{REF}$ under its operable condition. The output terminal of the reference voltage circuit 2 is connected further to a non-inverting input terminal ⊕ of an operational amplifier 1. Between the non-inverting input terminal ⊕ and inverting input terminal ⊖ is connected a photoelectromotive element 3 for photometry with its anode toward the inverting input terminal ⊖ which element generates a photocurrent corresponding to the amount of received light from an object being photographed. Between the output terminal of amplifier 1 and the inverting input terminal ⊖ is connected a diode 4 for logarithmic compression with its anode toward the inverting input terminal ⊖ which diode converts the photocurrent to a voltage of logarithmic value. A terminal 11, to which a signal for initiating a photometry which turns from a low level (hereinafter referred to as "L" level) to a high level (hereinafter referred to as "H" level) in synchronism with a shutter release operation is applied, is connected through a resistor 12 to the bases of NPN transistors 13, 14. These transistors 13, 14 form a switching circuit between power supply circuits for reference voltage circuit 2 and operational amplifier 1. The collector of transistor 13 is connected to a negative power voltage terminal of reference voltage circuit 2 and the collector of transistor 14 is connected through a first set resistor "7" for setting a normal bias current of operational amplifier 1 to the negative power voltage terminal of operational amplifier 1. Emitters of transistors 13, 14 are connected to the negative pole of battery 6 which is connected to the ground. The positive pole of battery 6 is connected to a positive power terminal of reference voltage circuit 2 and operational amplifier 1. A second set resistor 15 is connected in parallel relation with a series circuit including set resistor 7 which is connected to amplifier 1 and transistor 14. The set resistor 15 has a much larger resistance than that of resistor 7 and provides a bias current of an extremely low power consumption to amplifier 1.

Figure 4:
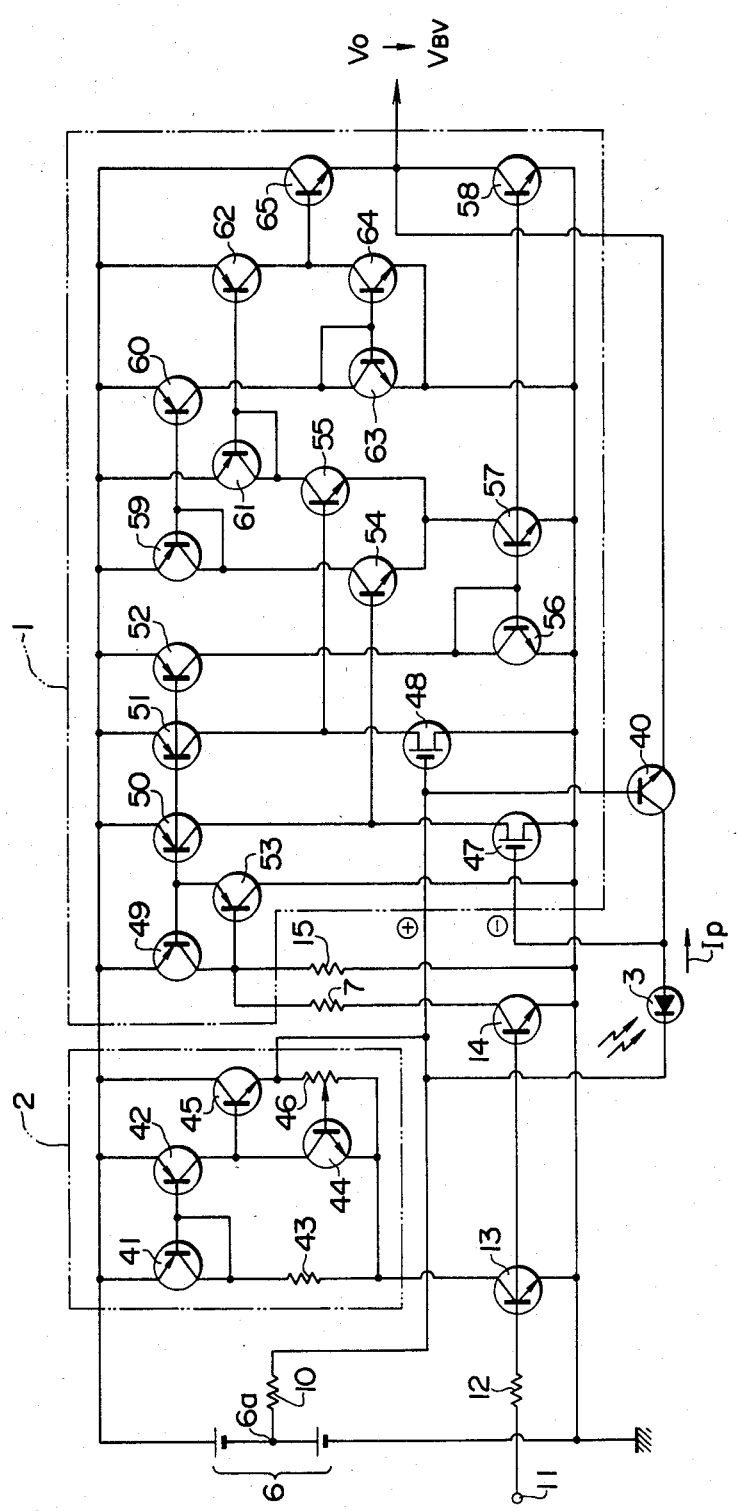
FIG. 4 is a schematic diagram of a concrete circuit arrangement illustrating the photometric apparatus shown in FIG. 3.

Referring now to FIG. 4, the reference voltage circuit 2 includes PNP transistors 41, 42 of the same characteristics which form a well known current mirror circuit, a resistor 43 which is connected to the bases of transistors 41, 42 and the collector of transistor 41, NPN transistors 44, 45 and a variable resistor 46 connected between the emitters of transistor 44, 45 for presetting a reference voltage. Both emitters of transistors 41, 42 are connected to the positive pole of battery 6 and their bases are connected to each other as well as the collector of transistor 41. The collector and emitter of transistor 44 are connected to the collector of transistor 42 and the collector of transistor 13, respectively. The collector and base of transistor 45 are connected to the positive pole of battery 6 and the collector of transistor 42, respectively. The slidable terminal of variable resistor 46 is connected to the base of transistor 44. The output terminal of reference voltage circuit 2 is a junction point between the emitter of transistor 45 and variable resistor 46 which point is connected to the non-inverting input terminal ⊕ of amplifier 1. The non-inverting input terminal ⊕ is connected to the cathode of photoelectromotive element 3 and through resistor 10 to the intermediate tap 6a of battery 6, on the outside of amplifier 1. The inverting input terminal ⊖ of amplifier 1 is connected to the anode of photoelectromotive element 3 and the collector of NPN transistor 40 for logarithmic compression. The operational amplifier 1 is of a high input impedance, and its inverting input terminal ⊖ is connected to the gate of a MOS type FET transistor 47 (hereinafter referred to as MOS-FET) and its non-inverting input terminal ⊕ is connected to the gate of MOS-FET 48. The gate of MOS-FETS 48 is connected to the base of transistor 40. The drains of MOS-FET 47, 48 are connected to collectors of transistors 50, 51 among five PNP transistors 49 to 53 of the same characteristics which form a current mirror circuit, respectively, and their sources are connected to the ground. Transistors 49 to 52 each have their emitters connected to the positive pole of battery 6 and their bases connected to each other in common which is connected to the emitter of transistor 53. The base of transistor 53 is connected to the collector of transistor 49 which is connected to one end of the first and second set resistors 7, 15. The junction between the collector of transistor 50 and the drain of MOS-FET 47 is connected to the base of an NPN transistor 54 and the junction between the collector of transistor 51 and the drain of MOS-FET 48 is connected to the base of an NPN transistor 55. Transistors 54, 55 form a differential amplifier. The collector of transistor 52 is connected in common to the base of three NPN transistors 56, 57, 58 of the same characteristics which form a current mirror circuit and the collector of transistor 56. The emitters of transistors 56 to 58 are connected to the ground and the collector of transistor 57 is connected to the emitters of transistors 54, 55. The collector of transistor 54 is connected in common to the base of two PNP transistors 59, 60 of the same characteristics which form a current mirror circuit and the collector of transistor 59. The collector of transistor 55 also is similarly connected in common to the base of two PNP transistors 61, 62 of the same characteristics which form a current mirror circuit and the collector of transistor 61. Each emitter of transistors 59 to 62 is connected to the positive pole of battery 6. The collector of transistor 60 is connected in common to the base of two NPN transistors 63, 64 of the same characteristics which form a current mirror circuit regarded as a high gain circuit and the collector of transistor 63. The collector of transistor 62 is connected to the collector of transistor 64 and the base of an NPN transistor 65 for output. The emitters of transistors 63, 64 are connected to the ground. Transistor 65 has its collector connected to the positive pole of battery 6 and its emitter connected to the collector of transistor 58. The junction between the emitter of transistor 65 and the collector of transistor 58 is connected to the emitter of transistor 40 and forms an output terminal of operational amplifier 1 for deriving a photometric output of brightness.

Figure 5:
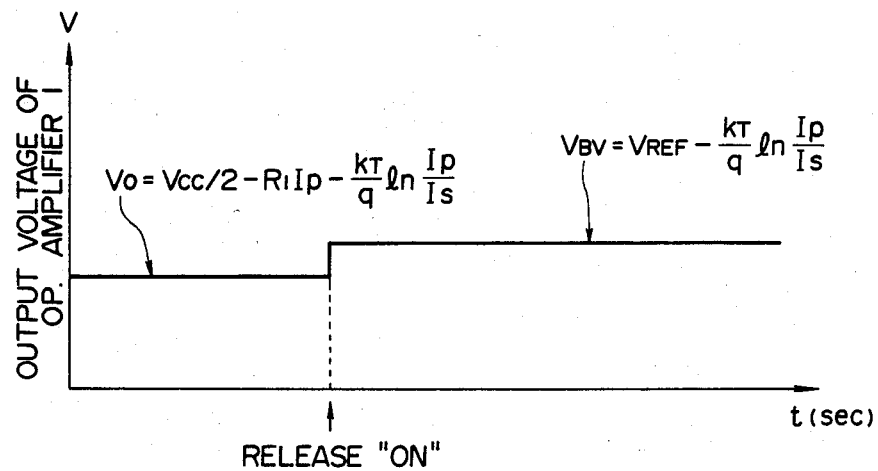
FIG. 5 is a diagram illustrating a characteristic curve of variation in output voltage during the photometry of the photometric apparatus shown in FIGS. 3 and 4.

In operation, terminal 11 is at the "L" level prior to the shutter release and hence transistors 13, 14 are both off. As transistor 13 is off, reference voltage circuit 2 is not supplied with power and is inoperable. Therefore, no reference voltage $V_{REF}$ is produced at the output terminal of the circuit 2 or the junction between the emitter of transistor 45 and variable resistor 46 which is in a condition of high impedance. Accordingly, the non-inverting input terminal ⊕ of amplifier 1 is under the condition that a voltage is applied through resistor 10 from the intermediate tap 6a of battery 6 instead of a reference voltage $V_{REF}$. Additionally, as the transistor 14 is off, the amplifier 1 is supplied with a battery voltage under the condition that only the second set resistor 15 of high resistance of the two set resistors 7, 15 is connected thereto. At this time, a very small bias current flows through the set resistor 15 and transistor 49 so that the same amount of current flows through collectors of transistors 50, 51, 52. Transistors 50, 51 are loads for MOS-FET 47, 48 which are connected to the inverting input terminal ⊖ and the non-inverting input terminal ⊕, respectively, and transistor 52 supplies a bias current to a transistor circuit in the later stage. Collector currents of transistors 50 to 52 are so small and hence currents flowing through transistor circuits in the later stage also are small so that the power consumption of amplifier 1 may be limited to less than several $\mu W$. Specifically, the amplifier 1 is operable with an extremely low power consumption even prior to the shutter release. Accordingly, when a photocurrent Ip corresponding to brightness of an object being photographed flows through photoelectromotive element 3, the photocurrent Ip flows through diode 4, that is from the collector of transistor 40 to the emitter thereof and through the collector of transistor 58 to the emitter thereof to derive a voltage $V_0$ corresponding to Ip at the output terminal of amplifier 1. The output voltage $V_0$ is represented in the following equation, as shown in FIG. 5, assuming that the battery voltage is Vcc and a voltage from the intermediate tap 6a is Vcc/2:

$$V_0 = Vcc/2 - R_1 Ip - (kT)/(q) ln(Ip)/(Is)$$

where $R_1$ is the resistance of resistor 10, Is is the backward saturation current of diode 4 or transistor 40, k is the Boltzman constant, T is the absolute temperature and q is the charge of an electron. At this time, as the ouput terminal of reference voltage circuit 2 and the non-inverting input terminal ⊕ of amplifier 1 are under a high impedance condition, a leakage current from battery 6 through resistor 10 to the output terminal of reference voltage circuit 2 or the non-inverting input terminal ⊕ is so small that it may be negligible. Eventually, prior to the shutter release, a total current consumed in the photometric circuit is the sum of a current consumed in amplifier 1 itself and a photo-current Ip of photoelectromotive element 3. A power consumption caused by the total current is of an extremely low power consumption not much exceeding several $\mu W$ and hence the apparatus is useful sufficiently even when a button shaped small battery 6 is employed.

Under the above condition, when a shutter is released and a level at the terminal 11 for a photometry initiation signal is turned to the "H" level, transistors 13, 14 for switching the circuit are simultaneously turned on. With transistor 13 on, reference voltage circuit 2 is supplied with power to render it operative and the collector current of transistors 41, 42 flows through bias resistor 43. When the collector current of transistor 42 flows through the base-emitters of transistors 45, 44 to turn them on, a reference voltage $V_{REF}$ of low impedance is produced at the output terminal of reference voltage circuit 2. Assuming that a voltage between the base and the emitter of transistor 44 is $V_{BE}$ and the sliding terminal of variable resistor 46 which is connected to the base of transistor 44 is at the center of the resistor, it becomes $V_{REF} = 2 V_{BE}$. A load current which is an output of the reference voltage $V_{REF}$ is supplied to amplifier 1 as the collector current of transistor 45 for current amplification.

With transistor 14 on, transistors 49, 53 in amplifier 1 which have been biased only by set resistor 15 of high resistance up to that time are biased by the parallel circuit of set resistors 15, 7 to increase the collector current of transistor 49. As a result, an increased current similarly flows through the collectors of transistors 50, 51, 52. Among these transistors, transistors 50, 51 act as transistor loads of MOS-FETs 47, 48, respectively, and hence collector currents of transistors 54, 55 for differential amplification are increased. As transistor 52 is connected in series with transistor 56, collector currents of transistor 57 for supplying transistors 54, 55 with a bias current and transistor 58 for supplying output transistor 65 with a bias current are increased. Consequently, collector currents of transistors 59 to 65 are are also increased and amplifier 1 performs the amplification action in a normal operation mode. As a result, when a shutter is released and the "L" level at the terminal 11 turns to the "H" level, a level at the output terminal of amplifier 1 is immediately switched from the above-mentioned output voltage $V_0$ to an output voltage $V_{BE} = V_{REF} - (kT)/(q) ln(Ip)/(Is)$, as shown in FIG. 5, which is of a low impedance having a value converted to a logarithmic compressed value of the photocurrent Ip from the reference voltage $V_{REF}$. Thus, a photometric datum corresponding to brightness of an object being photographed may be certainly obtained without delay. Specifically, it is possible sufficiently to limit a time period from the time of output voltage $V_0$ to the time when a stabled photometric voltage $V_{BV}$ is obtained by application of the photometric initiation signal at the terminal 11 by the shutter release to one msec or below.

In the photometric apparatus of the above embodiments, a battery arrangement of 1.5 V×2 is employed as battery 6 and a voltage of 1.5 V from the intermediate tap 6a is employed as a voltage to be applied to the non-inverting input terminal ⊕ of amplifier 1. It is to be understood that any voltage from the intermediate tap may be employed with a battery arrangement such as 1.5 V×3, 1.5 V×4 or the like.

What is claimed is:
1. A photometric apparatus for a camera, comprising:
   a power source for supplying power to a camera;

an impedance element connected to a voltage divider terminal of said power source;

a reference voltage circuit whose output terminal is connected to said voltage divider terminal through said impedance element, the circuit producing a reference voltage of a low impedance at said output terminal during its operable condition;

an operational amplifier which has an input terminal to which a voltage at the output terminal of said reference voltage circuit is constantly applied and which is constantly in an operable condition with a bias current of an extremely low power consumption, the amplifier producing a logarithmically converted voltage of a photocurrent flowing through a photoelectromotive element for photometry which is connected between both input terminals of said amplifier with a zero bias; and a switching circuit for switching said reference voltage circuit from its inoperable condition and switches said operational amplifier from a condition that a bias current of an extremely low power consumption is supplied to a normal operable condition that a normal bias current is supplied, in synchronism with a photometry initiation signal.

2. A photometric apparatus according to claim 1, in which said impedance element is a resistor of high impedance (high resistance).

3. A photometric apparatus according to claim 1, in which said reference voltage circuit comprises a transistor circuit which becomes operable by the switching action which is in synchronism with said switching circuit and a variable resistor for presetting a reference voltage at its output terminal while said transistor circuit is operable.

4. A photometric apparatus according to claim 1, in which said operational amplifier comprises a first set resistor for supplying a bias current sufficient to allow said amplifier to perform a predetermined photometric operation and a second set resistor of high resistance for supplying said amplifier with a bias current under an extremely low power consumption, whereby a bias current is applied through at least said first set resistor to said amplifier by a switching action of said switching circuit in synchronism with a photometry initiation signal and a bias current is applied only by said second set resistor to said amplifier while said switching circuit is in an inoperable condition.

5. A photometric apparatus according to claim 1, in which said switching circuit comprises a first switching transistor for switching said reference voltage circuit from its inoperable condition to its operable condition by turning said switching circuit on in synchronism with a photometry initiation signal and a second switching transistor for switching said operational amplifier from a condition that a bias current of an extremely low power consumption is supplied to another condition that a normal bias current is supplied concurrently with the switching action of said first switching transistor.

6. A photometric apparatus for a camera comprising an operational amplifier having first and second input terminals and an output terminal;

a photoelectromotive element for photometry coupled across said input terminals;

semi-conductor means for producing a logarithmically converted voltage of a photocurrent flowing through the photoelectromotive element coupled between said output terminal and one of said input terminals of said operational amplifier;

a power source;

a reference voltage circuit having an output coupled to one input of said operational amplifier;

coupling means including a voltage divider and impedance means coupled between said power source and one input of said operational amplifier;

a switching circuit responsive to a photometry initiated signal for turning on the normally disabled reference voltage circuit, whereby a low voltage reference level is applied to said operational amplifier by said impedance means when said reference voltage circuit is disabled and a voltage reference level of greater voltage value is applied to said operational amplifier by said reference voltage circuit upon the occurrence of said photometry initiate signal.

7. The photometric apparatus of claim 6 further comprising a second switching circuit for providing a low bias current to said operational amplifier in the absence of a photometry initiate signal, and for abruptly increasing the bias current provided to said operational amplifier upon the occurrence of said photometry initiate signal.

* * * * *

UNITED STATES PATENT AND TRADEMARK OFFICE
CERTIFICATE OF CORRECTION

PATENT NO. : 4,498,753

DATED : February 12, 1985

INVENTOR(S) : Kazunori Mizokami

It is certified that error appears in the above-identified patent and that said Letters Patent is hereby corrected as shown below:

Column 2 line 22 change "areas" to "area".

Column 4 line 33 change "MOS-FETS" to "MOS-FET".

Column 4 line 34 change "MOS-FET" to "MOS-FETS".

Signed and Sealed this

Eleventh Day of June 1985

[SEAL]

Attest:

DONALD J. QUIGG

Attesting Officer     Acting Commissioner of Patents and Trademarks